United States Patent [19]

Lai

[11] Patent Number: 4,873,785

[45] Date of Patent: Oct. 17, 1989

[54] TRAP

[76] Inventor: Shun T. Lai, No. 7, Alley 73, Wan Nien Lane, Tung Ho Li, Yuan Lin Chen,, Jang-Hwa Hsien, Taiwan

[21] Appl. No.: 322,507

[22] Filed: Mar. 13, 1989

[51] Int. Cl.$^4$ ............................................ A01M 23/18
[52] U.S. Cl. ...................................................... 43/61
[58] Field of Search ......................... 43/61, 62, 60, 74

[56] References Cited

U.S. PATENT DOCUMENTS

| | | | |
|---|---|---|---|
| 331,223 | 11/1885 | Ayres | 43/61 |
| 833,562 | 10/1906 | Stick | 43/61 |
| 1,249,248 | 12/1917 | Thompson | 43/61 |
| 1,410,738 | 3/1922 | Dorseth | 43/61 |
| 1,453,615 | 5/1923 | Bauman | 43/61 |

Primary Examiner—M. Jordan
Attorney, Agent, or Firm—Rogers, Howell & Haferkamp

[57] ABSTRACT

A trap with two openable side doors to trap animals. The trap includes a top plate, a bottom plate, four side doors, two elongated elements and a delicate sensing means. In the four doors, two or four of them are selectively openable, but only two of them which face each other can be opened at one time. Springs are provided for connecting the top plate and side openable doors. The sensing means comprises a block for hooking the elongated elements and three hooks for hooking baits to entrap animals. Each of the elongated elements is substantially L-shaped with a hooked end. While trapping animals, two openable doors are opened and fixed by inserting the elongated elements into a slot on each opening door and then elongated elements are slightly hooked on the block with the hooked ends. When animals are enclosed in the trap, bite the bait or touch the sensing means, the block will be disturbed. The elongated elements are released and side opening doors move inwards due to springs and are closed by lock means which immediately fall down as the elongated elements are released.

2 Claims, 4 Drawing Sheets

4,873,785

TRAP

BACKGROUND OF THE INVENTION

The present invention relates to a trap, and more particularly to a trap with two sets of openable side doors to trap animals.

The present invention comprises a top door, a bottom plate, four side doors, two elongated elements and a delicate sensing means.

In the four doors, two or four of them are selectively openable, but only two of them which face each other can be opened at the same time. The sensing means comprises a block for hooking the elongated elements and a plurality of hooks for hooking baits to entrap animals. Each elongated element is substantially L-shaped with a crooked end. While trapping animals, the openable doors are opened and held by inserting the elongated elements into slots on each openable door and then elongated elements are slightly hooked on the block with the crooked ends. When animals are enclosed in the trap, bite the bait or touch the sensing means, the block is distributed and releases the elongated elements. At the same time, the side opening doors will move inwards due to springs and be closed by lock means of the openable doors which immediately fall down as the elongated elements are released.

Conventional traps often use a single side openable door, with the other three side doors being fixed. The traps are not sensitive enough, sometimes the bait is eaten by the animals and the traps still do not go off.

The present invention provides a more sensitive device to trap animals with two openable doors.

The present invention comprises four openable doors, two of which are openable at the same time to trap animals.

- SUMMARY OF THE INVENTION

It is therefore an object of the present invention to provide two or four openable side doors for trapping animals.

Another object of the present invention is to provide a more sensitive trap.

Other objects and advantages of this invention will be apparent to those having ordinary skill in the art when the following detailed description has been read in conjunction with the accompanying drawings.

DETAILED DESCPTION OF THE PREFERRED EMBODIMENT

Figure 1:
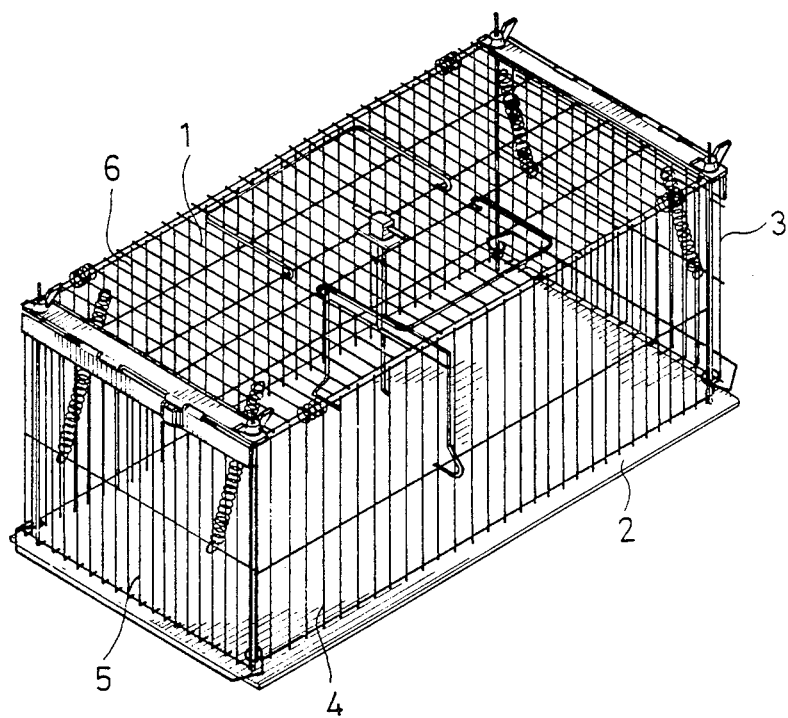
FIG. 1 is a perspective view of a trap in accordance with the present invention, in a closed state.
Figure 2:
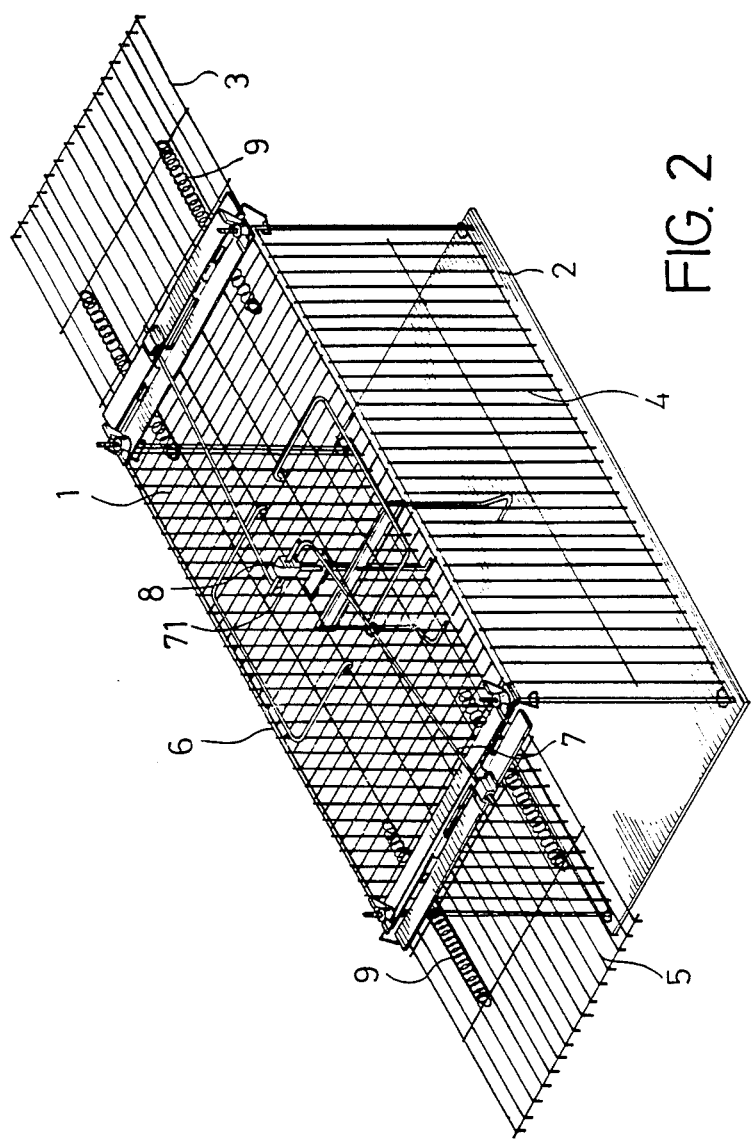
FIG. 2 is a perspective view of a trap in accordance with the present invention, in trapping state.

Referring now to FIGS. 1 and 2, the present invention comprises a top plate 1, a bottom plate 2, four side doors 3, 4, 5 and 6, two elongated elements 7 and a delicate sensing means 8.

Of the four side doors, two side doors 3 and 5 are openable and two side doors 4 and 6 are fixed. The two openable doors 3 and 5 are fixed to the top plate 1 in any known manner. Springs 9 are provided for connecting the two openable doors 3 and 5 and the top plate 1.

The top plate 1, the bottom plate 2 and the side doors 3, 4, 5 and 6 can be made of any known material and in any known manner.

Figure 3:
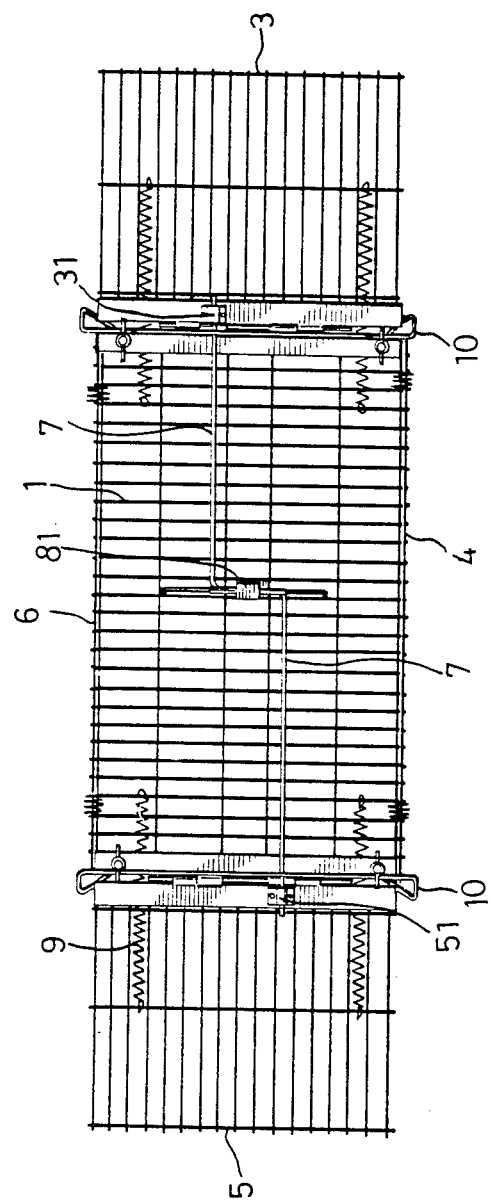
FIG. 3 is a top view of the trap of FIG. 2.
Figure 4:
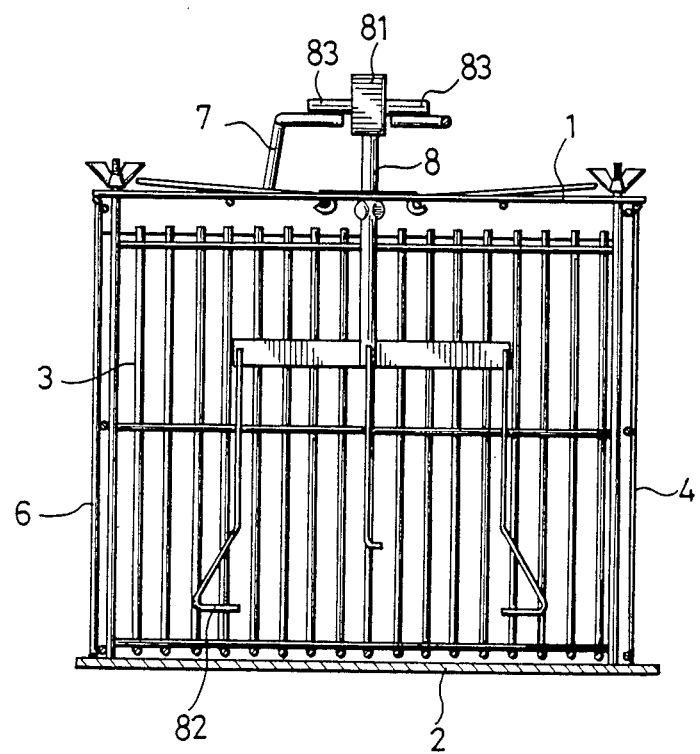
FIG. 4 is a side view of the trap in accordance with the present invention.

Referring now to FIGS. 3 and 4, the sensing means 8 comprises a block 81 for two elongated elements 7 to attach and a plurality of hooks 82 for hooking bait to entrap animals. The block 81 is substantially rectangular with two small protuberances 83 protruding oppositely therefrom.

Each of the elongated elements 7 is substantially L-shaped with a crooked end 71. While trapping animals, two openable door 3 and 5 are opened and held by inserting an end of a straight portion of the two elongated elements 7 into slots 31 and 51 on each openable door and then two elongated elements 7 are slightly hooked on the block with the crooked ends 71. When animals are enclosed in the trap, bite the bait or touch the sensing means, the block 81 is disturbed and releases the two elongated elements 7. At the same time, two side openable doors 3 and 5 will move inwards due to springs 9 and closed by lock means 10 of two openable doors 3 and 5 which immediately fall down as the two elongated elements 7 are released.

The present invention may includes four openable side doors; i.e., all the side doors are openable, but only two doors which diamatrically face each other can be opened at the same time.

Nevertheless, the elongated elements 7 may integrally formed with the openable doors.

As various possible embodiments might be made of the above invention without departing from the scope of the invention, it is to be understood that all matter herein described or shown in the accompanying 15 drawings is to be interpreted as illustrative and not in a limiting sensing. Thus it will be appreciated that the drawings are exemplary of a preferred embodiment of the invention.

I claim:

1. A trap comprising a top plate, a bottom plate, four side doors, two elongated elements and a delicate sensing means, wherein two of said side doors face each other are openable and connected to said top door by springs, each of said openable doors having a slot thereon, said sensing means comprising a block which is above said top plate and a plurality of hooks which are below said top door, said block being substantially rectangular with two small protuberances parts protruding oppositely therefrom, each of said elongated elements being substantially L-shaped with a crooked end;

when in use, two of said openable doors being opened and held horizontally by said elongated elements which are attached to said block with said crooked end of said elongated members while an end of a straight portion of said elongated elements are inserted into said slots of said openable doors.

2. A trap is claimed in claim 1, wherein said elongated elements are integrally formed with said openable doors.

* * * * *